(12) United States Patent
Selzer

(10) Patent No.: US 6,606,616 B1
(45) Date of Patent: Aug. 12, 2003

(54) MODIFIED ACTION RULES

(75) Inventor: Gary M. Selzer, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/203,631

(22) Filed: Dec. 1, 1998

(51) Int. Cl.$^7$ .................................................. G06N 5/02
(52) U.S. Cl. .............................. 706/47; 709/331; 711/9
(58) Field of Search .......................... 706/47; 709/331; 713/1; 717/9

(56) References Cited

U.S. PATENT DOCUMENTS

| | | | |
|---|---|---|---|
| 4,186,413 A | | 1/1980 | Mortimer |
| 4,368,486 A | | 1/1983 | Degoulet et al. |
| 5,227,874 A | | 7/1993 | Von Koborn |
| 5,285,278 A | | 2/1994 | Holman |
| 5,325,127 A | | 6/1994 | Dinsel |
| 5,414,846 A | * | 5/1995 | Lemble et al. .................. 713/1 |
| 5,481,370 A | | 1/1996 | Kim |
| 5,488,423 A | | 1/1996 | Walkingshaw et al. |
| 5,500,681 A | | 3/1996 | Jones |
| 5,561,800 A | * | 10/1996 | Sabatella ..................... 709/331 |
| 5,572,247 A | | 11/1996 | Montgomery et al. |
| 5,594,493 A | | 1/1997 | Nemirofsky |
| 5,655,945 A | | 8/1997 | Jani |
| 5,739,864 A | | 4/1998 | Copeland |
| 5,761,606 A | | 6/1998 | Wolzien |
| 5,768,426 A | | 6/1998 | Rhoads |
| 5,806,044 A | | 9/1998 | Powell |
| 5,821,983 A | | 10/1998 | Weiss |
| 5,835,864 A | | 11/1998 | Diehl et al. |
| 5,854,932 A | * | 12/1998 | Mariani et al. ................. 717/9 |
| 5,872,589 A | | 2/1999 | Morales |
| 5,880,769 A | | 3/1999 | Nemirofsky et al. |
| 5,907,350 A | | 5/1999 | Nemirofsky |
| 5,953,047 A | | 9/1999 | Nemirofsky |

OTHER PUBLICATIONS

Lucent Technologies, "nmake Release lu3.2—New ACTIONWRAP Special Atom", <http://www.bell-labs.com/project/nmake/vgraph/lu3.2/actionwrap.html>, viewed Mar. 25, 2001, 1429HRS.*

Lucent Technologies, "nmake Release lu3.2—.ACTION-WRAP Example", <http://www.bell-labs.com/project/nmake/vgraph/lu3.2/awex.html>, viewed Mar. 25, 2001, 1429HRS.*

Lucent Technologies, "nmake: lu3.2 Release Notes (New Features)", <http://www.bell-labs.com/project/nmake/rnotes-lu3.2/s2.html>, viewed Mar. 24, 2001, 1004HRS.*

Lucent Technologies, "nmake: lu3.2 Release Notes", <http://www.bell-labs.com/project/nmake/rnotes-lu3.2/full.html>, viewed Mar. 25, 2001, 1354HRS.*

Lucent Technologies, "nmake: Tutorial:A Little Help with nmake", <http://www.bell-labs.com/project/nmake/tutorial/full.html>, viewed Mar. 25, 2001, 1251HRS.*

* cited by examiner

Primary Examiner—Wilbert L. Starks, Jr.
(74) Attorney, Agent, or Firm—Eugene J. Rosenthal

(57) ABSTRACT

A rule executing engine is modified to recognize, when present, a so-called "actionwrap" rule, which is a rule that is expanded and executed in place of the original rule, and the original rule is placed in the context of the actionwrap rule, so that it may operate upon the original rule. If the actionwrap rule is not present, the rule engine executes the original rule unmodified. An actionwrap rule may be defined to be present for some situations but not for others, and its presence or absence is defined by the user or users submitting the rules. Each defined actionwrap rule, when present, is applied in a uniform manner on each target rule. More than one actionwrap rule may be defined for use at any one time, and the various actionwrap rules in use at one time may be independent of each other or they be linked. If the actionwrap rules are linked, they must be activated in the correct order as specified by the actionwrap rule writer. Advantageously, a single, minimal change to the rule executing engine that user definable changes may be made to all of the rules in a substantially uniform manner. Additionally, an actionwrap rule that is active may, in operation, a) distinguish between the various rule types, or even specific rules, that it receives as context, and b) provide a different processing as a function of the received rule types, or specific rule.

26 Claims, 1 Drawing Sheet

MODIFIED ACTION RULES

TECHNICAL FIELD

This invention relates to the art of computer programming, and more specifically, to systems that execute user defined rules.

BACKGROUND OF THE INVENTION

A problem in the art of systems that execute user defined rules is that once the rule base is written, it is not easy to change all of the rules in a substantially uniform manner. Prior art approaches to changing all of the rules include the changing of all the rules individually, or changing the engine that executes the rules so as to apply a change to each of the rules. The former approach is difficult and time consuming, especially if the rules may be generated dynamically during operation of the rule executing engine. The latter approach suffers from the drawback that for each change of all of the rules that is desired a change must be made to the rule executing engine. Having to change the rule executing engine makes the system inflexible, and furthermore, changes cannot be made by the users who specify the rules because the rule executing engine is not accessible to them.

SUMMARY OF THE INVENTION

I have recognized that with essentially a single, minimal change to the rule executing engine user definable changes may be made to all of the rules in a substantially uniform manner. In particular, in accordance with the principles of the invention, the rule executing engine is modified to recognize, when present, a so-called "actionwrap"rule, which is a rule that is expanded and executed in place of the original rule, and the original rule is placed in the context of the actionwrap rule, so that the actionwrap rule may operate upon the original rule. If the actionwrap rule is not present, the rule engine executes the original rule unmodified. An actionwrap rule may be defined to be present for some situations but not for others, and its presence or absence is defined by the user or users submitting the rules. Each defined actionwrap rule, when present, is applied in a generally uniform manner on each target rule.

In accordance with an aspect of the invention, more than one actionwrap rule may be defined for use at any one time, and the various actionwrap rules in use at one time may be independent of each-other or they may be linked. If the actionwrap rules are linked, they must be activated in the correct order as specified by the actionwrap rule writer.

In addition to use in applying uniform changes to all rules for a period of time, in accordance with an aspect of the invention, an actionwrap rule that is active may, in operation, a) distinguish between the various rule types, or even specific rules, that it receives as context, and b) provide a different processing as a function of the received rule types, or specific rule. Although the changes to the rules being executed are no longer uniform, such changes may be uniform over broad categories of rules. Furthermore, advantageously, no additional change is needed to the rule engine or to the rules themselves to effectuate such functionality. Only the actionwrap rule needs to be properly specified.

DETAILED DESCRIPTION

Figure 1:
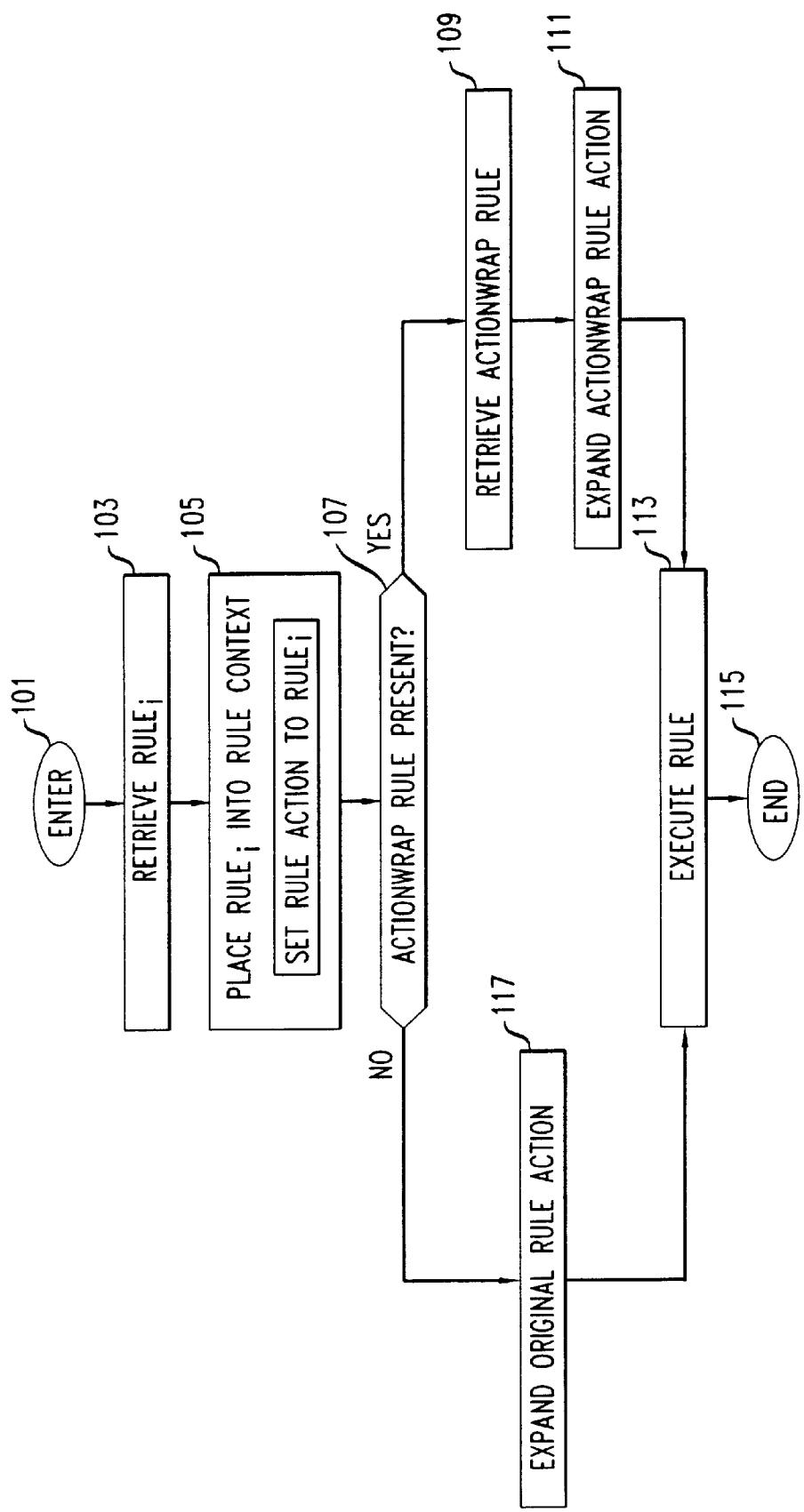
FIG. 1 shows an exemplary process for executing rules with a user definable change made to all of the rules for a user prescribed period in accordance with the principles of the invention.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGS., including functional blocks labeled as "processors"may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor"or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

FIG. 1 shows an exemplary process for executing rules with a user definable change made to all of the rules for a user prescribed period in accordance with the principles of the invention. The change effectuated may be made in a substantially uniform manner to all of the rules for the user prescribed period. Note that the invention is useful in rule executing systems that have a user immutable rule engine, and the rule engine executes rules that are specified by the user. These user specified rules may actually be written by the user or may be part of a library, or database, of rules. It is thus easy for the user to change the rules, but the user has no access to directly modify the rule engine. Execution of the rules by the rule engine may cause various jobs to be scheduled for execution on a machine that may be the same as the machine executing the rule engine or it may be a machine that has a network link to the machine executing the rule engine. The various jobs may be executed serially or in parallel, depending on the desire of the user and the dependencies, if any, between the various rules. One such rule execution system is NMAKE, a software build tool, which is commercially available from Lucent Technologies.

The process is entered in step 101 when a particular rule, Rule$_i$ is activated, i.e., all the prerequisites to execution of the rule have been met and the rule engine determines that the rule needs to be executed at this time. This step is performed by the rule engine in the conventional manner. Next, in step 103, the rule is retrieved from the rule source, which is any source for rules. Often the rule source is a so-called "rulebase", which is a database of rules. Such rulebases are often hierarchically organized, with rules higher in the hierarchy supplanting identical rules lower in the hierarchy. However, the rule source need not be a rule base but may be the output of any process which is specified as the source of a rule by the user.

Rule$_i$ is placed into the rule context of the rule engine in step 105. Doing so sets up several variables within the rule engine, including, in particular, the setting of the rule action to Rule$_i$.

Conditional branch point 107 tests to determine, in accordance with an aspect of the invention, if an actionwrap rule is currently present, i.e., must all rules being executed by the rule engine have the actionwrap rule applied to them before their execution. If the test result in step 107 is YES, control passes to step 109, in which the actionwrap rule is retrieved from a rule source, in the same manner that any other rule is retrieved, e.g., as described above in connection with step 103. However, the rule context is not changed in accordance with an aspect of the invention. In order for the rule context to not be changed, such functionality must be incorporated within the rule engine. Thereafter, in step 111, the actionwrap rule action is expanded, but the rule context of the rule remains that of Rule$_i$. Thus, the rule action is changed from being that of Rule$_i$ to being that of the actionwrap rule but with the context of Rule$_i$ applied to it. Advantageously, the actionwrap rule is able to eventually cause the execution of Rule$_i$ if appropriate. Advantageously, the expansion itself is performed in the conventional manner.

The results of the expansion performed in step 111 are then executed in the conventional manner in step 113. The process is exited in step 115.

If the test result in step 107 is NO, indicating that there is no actionwrap rule currently present, control passes to step 117, in which the rule action of Rule$_i$ itself is expanded. Thereafter, control passes to step 113, to execute the current rule, which is Rule$_i$ itself, and the process is exited in step 115.

An exemplary actionwrap rule may be written as
.ACTIONWRAP:
    echo making target $(<); $(@)
in the NMAKE rule language. Note that in NMAKE a rule has three parts: a) the target, which is generally taken to be the rule name, which is to the left of the colon; b) a list of prerequisite rules as well as other attributes and parameters for the rule; and c) the action, which starts on the following line and each line of which is typically preceded by a tab. In this example, the actionwrap rule's name, which is its target, is .ACTIONWRAP; there are no prerequisite rules or other attributes and parameters; and the action is a UNIX® KornShell script which has two parts. The first part of the action prints to standard output, which by default is the display screen, the words "making target"and the value of $(<) after expansion, which is the target, i.e., the name, of the rule to which the actionwrap rule is being applied. The second part of the rule, $(@) is expanded to the action of the rule to which the actionwrap rule is being applied, i.e., the action of the rule to which the actionwrap rule is being applied is itself executed. In other words, while this actionwrap rule is active, every rule that is executed by the rule engine appears to be modified so that it first prints "making target X", where X is the name of the rule, and only then is the rule itself executed. Those skilled in the art of rule specifying, e.g., in the use of NMAKE, will be able to develop actionwrap rules that will capture the output of any rule that is executed, change the inputs to any of the rules, send e-mail if an action fails, log failures in a database, or perform any function that can be written.

Given the foregoing, those of ordinary skill in the art of developing rule engines will readily be able to make the necessary modifications to their particular rule engines to implement actionwrap rule functionality. The specifics of modifications to the rule engine that are required cannot be given herein because they depend upon the detailed internal architecture and implementation of the particular rule engine to which actionwrap rule functionality is being added. As additional guidance on the changes that are necessary, it is pointed out that there are two main functional areas of the rule engine that may require modification,'specifically, a) entry of the user-specified actionwrap rules and their initialization in the rulebase, and b) retrieving and applying the actionwrap rules at the appropriate points during rule execution.

The entry and initialization of the actionwrap rules into the rulebase uses standard engine rule-handling facilities to the extent feasible. This allows an actionwrap rule to be managed and stored using conventional rule techniques as much as possible, even though an actionwrap rule has a novel effect upon the behavior of the rule engine at rule execution time.

The retrieving and applying of actionwrap rules requires modification of the rule processing steps that are performed when a rule is triggered, as compared with the rule processing steps of the prior art. More specifically, in the prior art, when a rule was triggered 1) the rule action was retrieved from the rulebase, 2) the rule context was set up, 3) the rule action was expanded relative to the rule context, and 4) the expanded action was sent for execution, e.g., to the shell in the case of NMAKE. To add actionwrap rule functionality, the expansion of the rule action relative to the rule context in item (3) above is not performed. Instead, an actionwrap rule is looked for in the rulebase, and if defined, it is retrieved and-expanded. However, the expansion of the actionwrap rule is performed relative to the original rule context. If the actionwrap rule is not defined, expand the original rule relative to the original rule context.

As an example of the use of actionwrap rules, the following simple Makefile, which is a file written in the NMAKE rule specification language, instructs NMAKE to build an executable program a from C language source files a.c and b.c.

a::a.c b.c

In doing so, depending on the particular implementation, without the presence of any actionwrap rules, NMAKE might generate the following commands in response to this Makefile:

cc -O -I- -c a.c
cc -O -I- -c b.c
cc -O -o a a.o b.o

These commands compile C source files a.c and b.c to produce object files a.o and b.o, and then link the object files together to produce executable program a.

The following Makefile has had added to it an actionwrap rule similar to that described above which adds a command to print the target name before executing the original rule action:

.ACTIONWRAP
    echo making $(<) $(@)
a a.c b.c

Note that the same actionwrap rule is uniformly applied to all executed actions. Thus, in response to this Makefile with this actionwrap rule NMAKE generates the same commands as originally, but with each command prepended with a command to print the action names as follows.

echo making target a.o
cc -O -I- -c a.c
echo making target b.o
cc -O -I- -c b.c
echo making target a
cc -O -o a a.o b.o Multiple actionwrap rules may be active for a rule engine at the same time. An ordering sequence is specified for the various concurrently active actionwrap rules. Such a sequence may be implicitly or explicitly specified. A lowest of the actionwrap rules is expanded in the manner described above, and the result of that expansion is placed in the rule context for use by the next higher actionwrap rule, whose expansion is placed in the rule context for use by the next higher actionwrap rule, and so on, until all the actionwrap rules have been expanded.

Those skilled in the art will appreciate that the actionwrap rule that is active may, in operation, a) distinguish between the various rule types, or even specific rules, that it receives as context, and b) provide a different processing as a function of the received rule types, or specific rule. Thus, one rule type may have a particular function performed for it by a particular actionwrap rule, e.g., tagging its output with a tag, while another rule type, e.g., the output of which is subsequently executed and so it cannot suffer being tagged, is not tagged by the same actionwrap rule. The types of rules may be recognized by the actionwrap rule based on an optional part of the rule context known as the rule attribute(s) or by any other information in the rule context. Although the changes to the rules being executed are no longer uniform, such changes may be uniform over broad categories of rules. Furthermore, advantageously, no additional change is needed to the rule engine or to the rules themselves to effectuate such functionality. Only the actionwrap rule needs to be properly specified.

The following is an example that varies the expanded rule depending upon the type of rule, i.e., the rule context. In this example, the rule target is tested for the presence of the .COMMAND attribute, which indicates that the target is an executable file. If the test succeeds, "command" is printed. Otherwise, by default, "target" is printed as before.

.ACTIONWRAP
    echo making $(<:A=.COMMAND:?command?target?) $(<) $(@)
a::a.c b.c The corresponding output generated by NMAKE is:

echo making target a.o
cc -O -I- -c a.c
echo making target b.o
cc -O -I- -c b.c
echo making command a
cc -O -o a a.o b.o

What is claimed is:

1. A method for executing rules in the form of computer program steps embodied on computer readable medium on a rule engine, said rule engine being a processor capable of executing said computer program steps, comprising the steps of:

obtaining, by said rule engine, one of said rules to be executed;

determining if an actionwrap rule is active, said actionwrap rule being in the form of computer program steps embodied on computer readable medium;

executing the actionwrap rule in said rule engine by applying said actionwrap rule to said obtained rule so that said rule engine enters a post actionwrap rule execution state as a result of executing the actionwrap rule as applied to said obtained rule; and supplying, by said rule engine, as an output any output specified by said actionwrap rule as applied to said obtained rule to be supplied.

2. The invention as defined in claim 1 wherein said actionwrap rule is specified by a user.

3. The invention as defined in claim 1 wherein said actionwrap rule is obtained from a source external to said rule engine.

4. The invention as defined in claim 1 wherein said actionwrap rule is obtained from execution of at least one other rule by said rule engine.

5. The invention as defined in claim 1 wherein said rule to he executed is dynamically generated.

6. The invention as defined in claim 1 wherein said actionwrap rule is dynamically changeable by operation of rules within a database of rules for execution by said rule engine.

7. The invention as defined in claim 1 wherein operation of said actionwrap rule is a function of said rule to be executed.

8. A method for executing rules which are embodied in the form of computer program steps embodied on computer readable medium on a rule engine, said rule engine being a processor capable of executing said computer program steps, the method comprising the steps of:

when an actionwrap rule is active, said actionwrap rule being in the form of computer program steps embodied on computer readable medium, for each rule obtained for execution, instead of executing, by said rule engine, said obtained rule directly, executing, by said rule engine, the actionwrap rule by applying it to said obtained rule so that said rule engine enters a post actionwrap rule execution state as a result of executing the actionwrap rule as applied to said obtained rule rather than a post rule only state that would have resulted had said obtained rule been executed by said rule engine in lieu of actionwrap rule applied to said obtained rule.

9. The invention as defined in claim 8 wherein said action wrap rule is specifiable by a user specifying rules to be obtained and executed by said rule engine.

10. The invention as defined in claim 8 wherein said rule to be executed is dynamically generated.

11. The invention as defined in claim 8 wherein operation of said actionwrap rule is a function of said rule to be executed.

12. A method for executing rules in the form of computer program steps embodied on computer readable medium on a rule engine, said rule engine being a processor capable of executing said computer program steps embodied on computer readable medium, the method comprising the steps of:
   obtaining a rule to be executed;
   applying an actionwrap rule to said obtained rule when said actionwrap rule is active and executing said rule as part of executing said actionwrap rule, said actionwrap rule being in the form of computer program steps embodied on computer readable medium so that said rule engine enters a post actionwrap rule execution state as a result of executing the actionwrap rule as applied to said obtained rule; and
   executing said obtained rule by said rule engine without applying said actionwrap rule when said actionwrap rule is not active so that said rule engine enters a post obtained rule execution state as a result of executing said obtained rule.

13. The invention as defined in 12 operation of said actionwrap rule is a function of said rule to be executed.

14. A method for executing rules in the form of computer program steps embodied on computer readable medium on a rule engine, said rule engine being a processor capable of executing said computer program steps, comprising the steps of:
   obtaining a set of rules to be executed;
   applying, in said rule engine, an actionwrap rule to each rule of said set of rules when said actionwrap rule is active for each rule of said set, said actionwrap rule being in the form of computer program steps embodied on computer readable medium.

15. The invention as defined in claim 14 wherein said actionwrap rule is uniformly applied to each rule of said set.

16. The invention as defined in claim 14 wherein said actionwrap rule is external to said rule engine.

17. The invention as defined in claim 14 wherein said actionwrap rule is defined within a database of rules for execution by said rule engine.

18. The invention as defined in claim 14 wherein at least one rule of said set of rules is generated by said rule engine during rule execution.

19. The invention as defined in claim 14 operation of said actionwrap rule is a function of said rule to be executed.

20. The invention as defined in claim 14 wherein said actionwrap rule is dynamically changeable by operation of rules within a database of rules for execution by said rule engine.

21. A rule engine for executing rules in the form of computer program steps embodied on computer readable medium, said rule engine including at least a processor, each of said rules potentially having at least a target, a list of prerequisite rules as well as other attributes and parameters for the rule, and an action, comprising:
   a software module embodied on computer readable medium for obtaining a particular rule to be executed when all prerequisites of said particular rule are met and for placing said particular rule into a rule context of said rule engine so that said rule action of said rule engine is set to said particular rule;
   a software module embodied on computer readable medium for obtaining an actionwrap rule in the form of computer program steps embodied on computer readable medium when one is present without placing said actionwrap rule into said rule context, so that said rule context remains the same as for said particular rule which was last placed into said rule context; and
   a software module embodied on computer readable medium for expanding an obtained rule for execution on said rule engine, whether or not said rule is an actionwrap rule.

22. The invention as defined in claim 21 further including a software module for executing said expanded rule.

23. A rule engine embodied in a computer executable medium for executing an actionwrap rule with a context of another rule for a plurality of rules.

24. A processor for executing rules as a rule engine, said rules being embodied as program steps in a computer readable medium, said processor implementing said rule engine so as to:
   obtain one of said rules for execution; and
   execute an actionwrap rule embodied as program steps in a computer readable medium by applying it to said obtained rule when said actionwrap rule is active.

25. The invention as defined in claim 12 wherein said post actionwrap rule execution state of said rule engine and said post obtained rule state of said rule engine are different when said rule engine starts from the same state prior to execution of said applying and executing states.

26. The invention as defined in claim 12 wherein said rule engine starts from the same state prior to execution of said applying and executing states but said post actionwrap rule execution state of said rule engine and said post obtained rule state of said rule engine are the same but were achieved by said rule engine having performed different operations and having passed through different sets of states prior to arriving at said respective one of said post actionwrap rule execution state of said rule engine and said post obtained rule state.

* * * * *